(12) United States Patent
Eliseev et al.

(10) Patent No.: US 8,978,141 B2
(45) Date of Patent: Mar. 10, 2015

(54) SYSTEM AND METHOD FOR DETECTING MALICIOUS SOFTWARE USING MALWARE TRIGGER SCENARIOS

(71) Applicant: Kaspersky Lab ZAO, Moscow (RU)

(72) Inventors: Evgeny Y. Eliseev, Moscow (RU); Victor V. Yablokov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/052,718

(22) Filed: Oct. 12, 2013

(65) Prior Publication Data

US 2015/0007325 A1 Jan. 1, 2015

(30) Foreign Application Priority Data

Jun. 28, 2013 (RU) ................................. 2013129555

(51) Int. Cl.
*G06F 21/00* (2013.01)
*G06F 21/56* (2013.01)

(52) U.S. Cl.
CPC ...................................... *G06F 21/56* (2013.01)
USPC ............................................................. 726/24

(58) Field of Classification Search
None
See application file for complete search history.

(56) References Cited

U.S. PATENT DOCUMENTS

| | | | |
|---|---|---|---|
| 7,614,084 | B2 | 11/2009 | Monastyrsky et al. |
| 8,069,372 | B2 | 11/2011 | Natvig |
| 8,099,596 | B1 | 1/2012 | Rusakov et al. |
| 8,161,556 | B2 | 4/2012 | Smith et al. |
| 2003/0159063 | A1 | 8/2003 | Apfelbaum et al. |
| 2009/0288167 | A1 | 11/2009 | Freericks et al. |

(Continued)

FOREIGN PATENT DOCUMENTS

| | | |
|---|---|---|
| RU | 91213 | 1/2010 |
| WO | 2012135192 A2 | 10/2012 |

OTHER PUBLICATIONS

B. M. Ruvinskaya et al. "Heuristic methods of malware detection based on scripts" http://dspace.nbuv.gov.ua/handle/123450789/6920. Published Dec. 30, 2008. p. 197, par. 1 from the top; p. 198. pars. 5-6 from the top; p. 199. par. 1 from the bottom and p. 200 par. 1 from the top; p. 201, pars. 2-3 from the top; p. 205. pars. 2, 3, and 5 from the bottom.

*Primary Examiner* — Samson Lemma
*Assistant Examiner* — Malcolm Cribbs
(74) *Attorney, Agent, or Firm* — Arent Fox LLP; Michael Fainberg

(57) ABSTRACT

Disclosed system and methods for detecting malware by performing behavioral malware analysis using malware trigger scenarios. In one aspect, a method for malware detection includes providing a plurality of malware trigger scenarios specifying different sets of malware trigger events known to trigger malicious behavior in malicious software. The method further includes executing a software program in a computer environment and creating one more malware trigger events as specified in the malware trigger scenarios. The method further includes monitoring execution events of the software program in the computer environment and determining based on the analysis of the monitored execution events whether the software program exhibits malicious behavior. When the software program exhibits malicious behavior, performing remedial actions on the software program. When the software program does not exhibit malicious behavior, selecting another scenario from the plurality of malware trigger scenarios for malware testing of the software program.

18 Claims, 8 Drawing Sheets

(56) References Cited

U.S. PATENT DOCUMENTS

2010/0122343 A1 5/2010 Ghosh et al.
2011/0167494 A1* 7/2011 Bowen et al. .................. 726/24
2012/0222123 A1 8/2012 Williams et al.
2013/0007883 A1* 1/2013 Zaitsev .......................... 726/24
2013/0104234 A1* 4/2013 Northup ......................... 726/24
2013/0145463 A1* 6/2013 Ghosh et al. ................... 726/22

* cited by examiner

SYSTEM AND METHOD FOR DETECTING MALICIOUS SOFTWARE USING MALWARE TRIGGER SCENARIOS

CROSS-REFERENCE TO RELATED APPLICATIONS

This application claims benefit of priority under 35 U.S.C. 119(a)-(d) to a Russian Application No. 2013129555 filed on Jun. 28, 2013, which is incorporated by reference herein.

TECHNICAL FIELD

The disclosure relates generally to the field of information security, and more specifically to systems, methods and computer program products for detecting malicious software by performing behavioral malware analysis using malware trigger scenarios.

BACKGROUND

The amount of malicious software, also known as malware, is steadily growing. The number of computing platforms for which malware is created is also increasing, and malicious applications for Android OS and Apple iOS are no longer a rarity. Therefore, antivirus companies are faced with new challenges to create new methods of detecting malware.

Known methods for detection of malicious software, which were successful in detecting malware in the past, often fail to detect new types of malware. Currently, the most popular malware detection methods include: heuristic analysis, signature analysis, behavioural analysis, and hash sum analysis. The signature and hash sum techniques are well suited for detecting known malware (i.e., software that has already been investigated and a specimen of which has been entered in a database of malicious software). However, these techniques may fail to detect modified malware code. The heuristic analysis overcomes this shortcoming, but may be ineffective in detecting obfuscated malware. The behavioural analysis often proves most effective in detecting modified malware, but even this method has a number of shortcomings. For example, in order to analyze behaviour of a program using this method, the program needs to be triggered first, which also constitutes the major shortcoming of behavioural analysis, since malicious software, before being detected, can already inflict harm to the system on which it has been triggered. Moreover, the behavioural analysis adversely affects the productivity of the system, as a whole, and the tested program in particular.

Therefore, there is a need to improve behavioural malware detection technique.

SUMMARY

Disclosed systems, methods and computer program products for detecting malicious software by performing behavioral malware analysis using malware trigger scenarios. In one example aspect, a method for malware detection includes providing a plurality of trigger scenarios specifying different sets of malware trigger events known to trigger malicious behaviour in malicious software. The method further includes executing a software program in a computer environment and creating one or more malware trigger events as specified in one of the plurality of malware trigger scenarios for malware testing of the software program. The method further includes monitoring execution events of the software program in the computer environment and determining based on analysis of the monitored execution events whether the software program exhibits malicious behaviour. When the software program exhibits malicious behaviour, performing remedial actions on the software program. When the software program does not exhibit malicious behaviour, selecting another malware trigger scenario from the plurality of malware trigger scenarios for malware testing of the software program.

In another example aspect, the malware trigger events include one or more of application events, operating system (OS) events and hardware events of the computer environment.

In another example aspect, executing a software program in a computer environment includes providing a plurality of interrupt handlers operable to monitor application events, OS events and hardware events of the computer environment.

In another example aspect, when the software program exhibits malicious behaviour, identifying one or more malware trigger events that triggered said malicious behaviour and placing the identified malware trigger events in an optimized scenario of popular events.

In another example aspect, determining based on analysis of the monitored execution events whether the software program exhibits malicious behaviour further includes: associating one or more malware trigger events known to trigger malicious behaviour in a malicious software with one or more templates of malicious behaviour; and analysing whether the monitored execution events match any of the templates of malicious behaviour to determine whether the software program exhibits malicious behaviour.

In another example aspect, executing a software program in a computer environment further includes analyzing application program interface (API) functions of the software program and selecting from a plurality of scenarios a scenario having similar API calls.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of system, method and computer program product for detecting malicious software by performing behavioral malware analysis using malware trigger scenarios. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The disclosed malware detection techniques provide broad control over events of execution of a tested program at different levels of a computer system, including software, OS and hardware, by utilizing malicious behaviour scenarios for detecting activation of harmful functions of the program. The term "hardware", as used herein, includes central and peripheral hardware of the computer device, such as CPUs, storage devices, communication modules (e.g., GSM, Bluetooth), etc. The computer system that is used to support the execution of tested applications and programs is called the program execution environment. The computer system may have a multilevel architecture shown in FIG. 1 described next.

Figure 1:
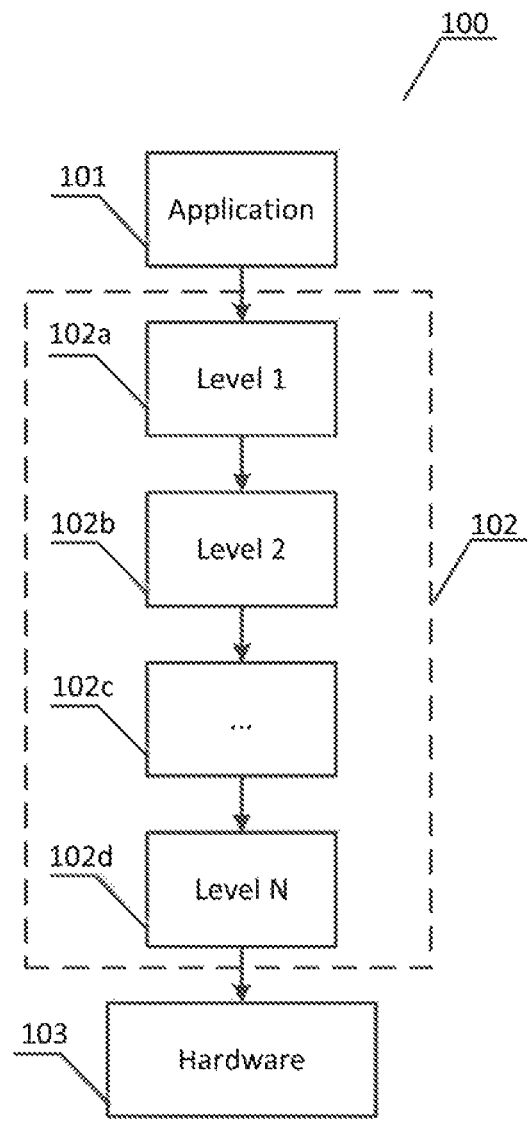
FIG. 1 is a diagram illustrating an example architecture of a multilevel computer system.

FIG. 1 shows example configuration of a computer system 100 comprising an application 101, multilevel operating system (OS) 102 and hardware 103. During its execution, an application 101 makes calls to API (application programming interface) functions of the OS 102 to perform certain action on the hardware 103. The OS 102 performs a large number of steps involving the complex multilevel architecture of the OS to pass the API function call from the application 101 to the hardware 103, after which the result of the execution of the API function is returned to the application 101. The OS levels may include, but not limited to application framework, runtime environment, libraries, security services, kernel, etc.

To understand execution of the application 101, it is desirable to monitor all levels of architecture of the OS 102 and hardware 103, if possible. In one example aspect, this can be achieved by modifying elements of the levels of architecture of the OS 102 and adding new elements that monitor each level of the computer architecture. This modification to the computer system 100 will not only allow monitoring of the execution of the application 101 at all levels of its execution on the computer system 100, but will also allow to control the execution of the application 101 at any level of the system architecture with the possibility of halting the execution of the application 101 at any of the levels of the computer architecture.

Figure 2A:
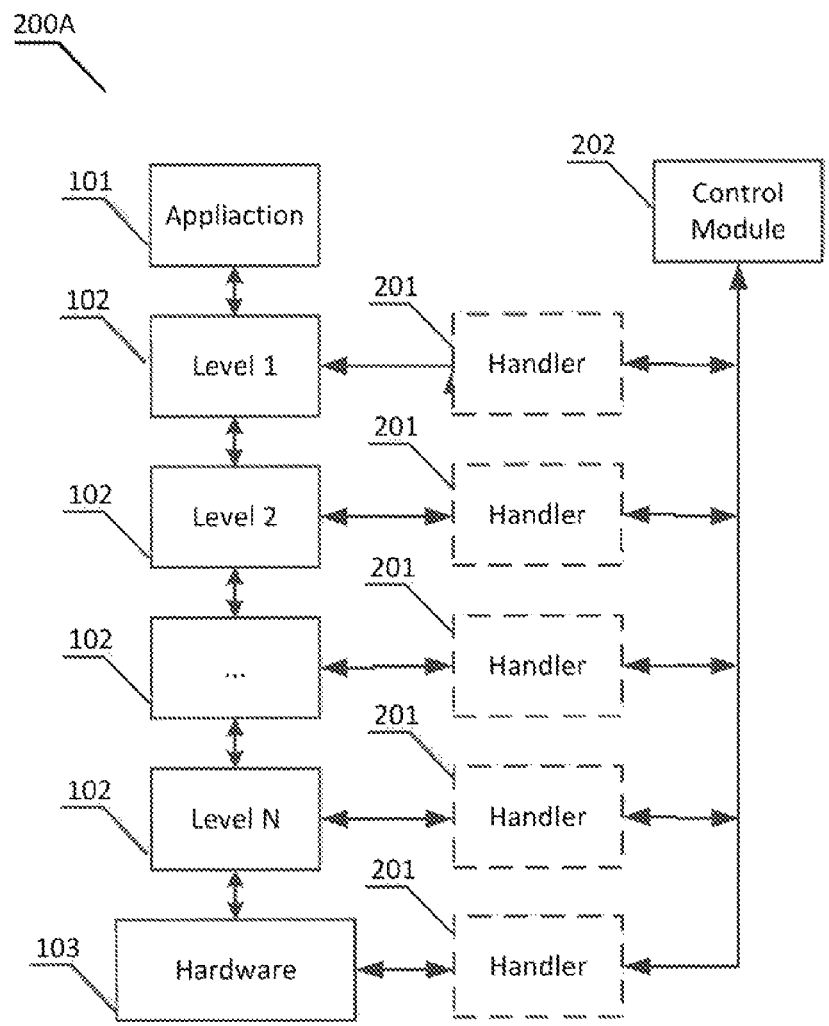
FIGS. 2A and 2B are diagrams illustrating examples of modified architectures of the computer system according to aspects of the present invention.
Figure 2B:
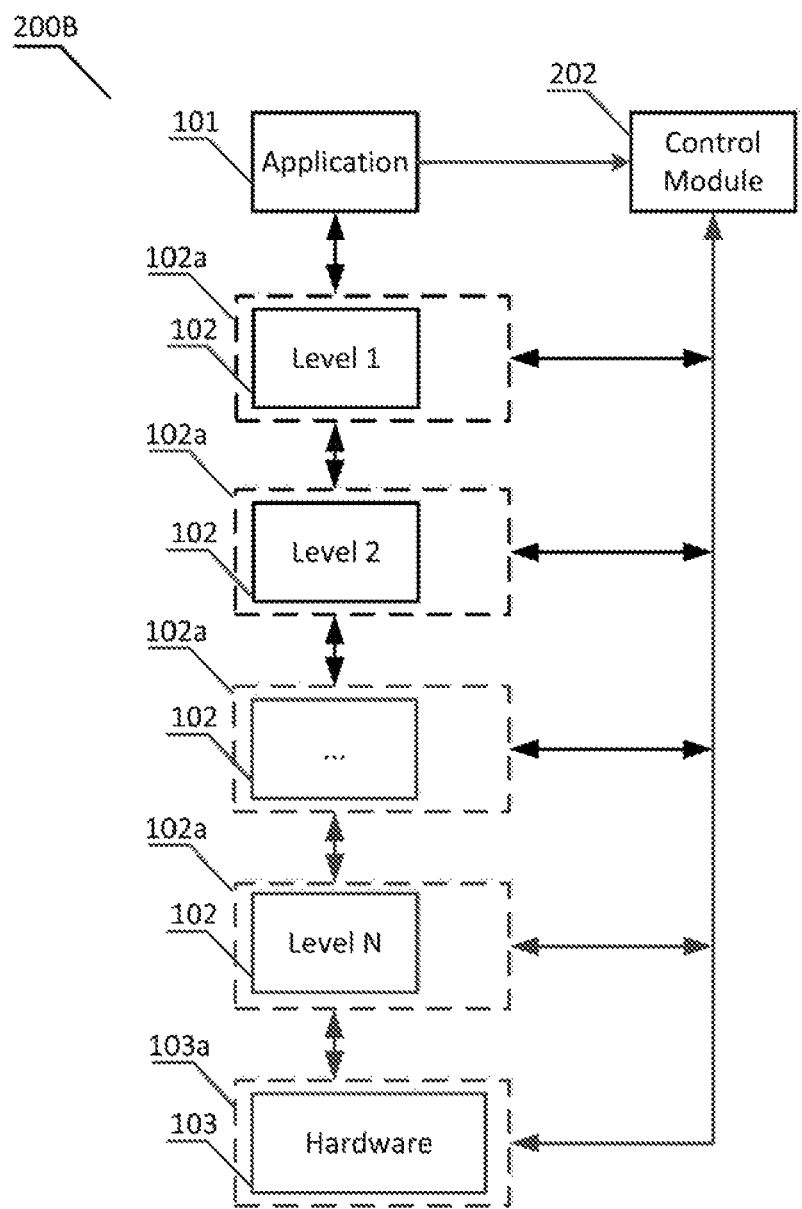

FIGS. 2A and 2B show example modifications of the computer system 100 of FIG. 1 according to various aspects of the present invention. FIG. 2A shows an example system modification 200A in which supplemental elements—handlers 201—are added at different level of the OS 102. The original elements of the levels may be minimally modified by, for example, placing interrupts in the original elements of each OS level, while the functions that process these interrupts may be exported to the separate handlers 201. The functions contained in the handler 201 may monitor the working of the modified OS level, control the working of the modified OS level, record information about events of execution of application 101 at each modified level, and provide to the control module 202 access to the recorded information about events of execution of application 101 at each level. The functions of the control module 202 will described below. FIG. 2B show another example system modification 200B according to another aspect, in which the functions described in the preceding example as being exported to the separate handlers 201 may be performed directly in the altered elements of levels 102a and 103a. Control of the handler 201 can be exerted directly by the functions built into the handler 201 or by the control module 202. The control module 202 may reside at the level of application 101 and have access the recoded information.

Therefore, the modified computer systems 200A and 200B allow collection of information about behaviour of applications 101 executed on these systems at multiple levels of the system architecture. In one aspect, system modification may also include adding a function capable of halting the execution of the applications at any architecture level or introducing corrections in their execution. For this reason, the modified computer systems 200A and 200B may control execution of the application 101 and prohibit execution of the application 101 in case harmful or malicious actions of application 101 are detected.

Malicious software is highly diverse: it varies in its function, purpose, and the nature of its interaction with the computer devices on which it runs. Even after starting an application 101 in the systems 200A and 200B and obtaining information on events caused by the execution of the application 101 at each system level, it is still may not be possible to determine whether the tested application is harmful or clean. This is primarily because the application may require a number of conditions (i.e., malware trigger events) to activate its malicious functionality. Such events may include, but not limited to: communication ports being switched on, specific type of active windows open, network connection status, date and time, type of device on which the investigated application was started, operating system version, presence of other applications on the device, current location of the device, active actions of the user, incoming calls and SMS, device turned on, rebooting of the device, and so on.

Figure 3:
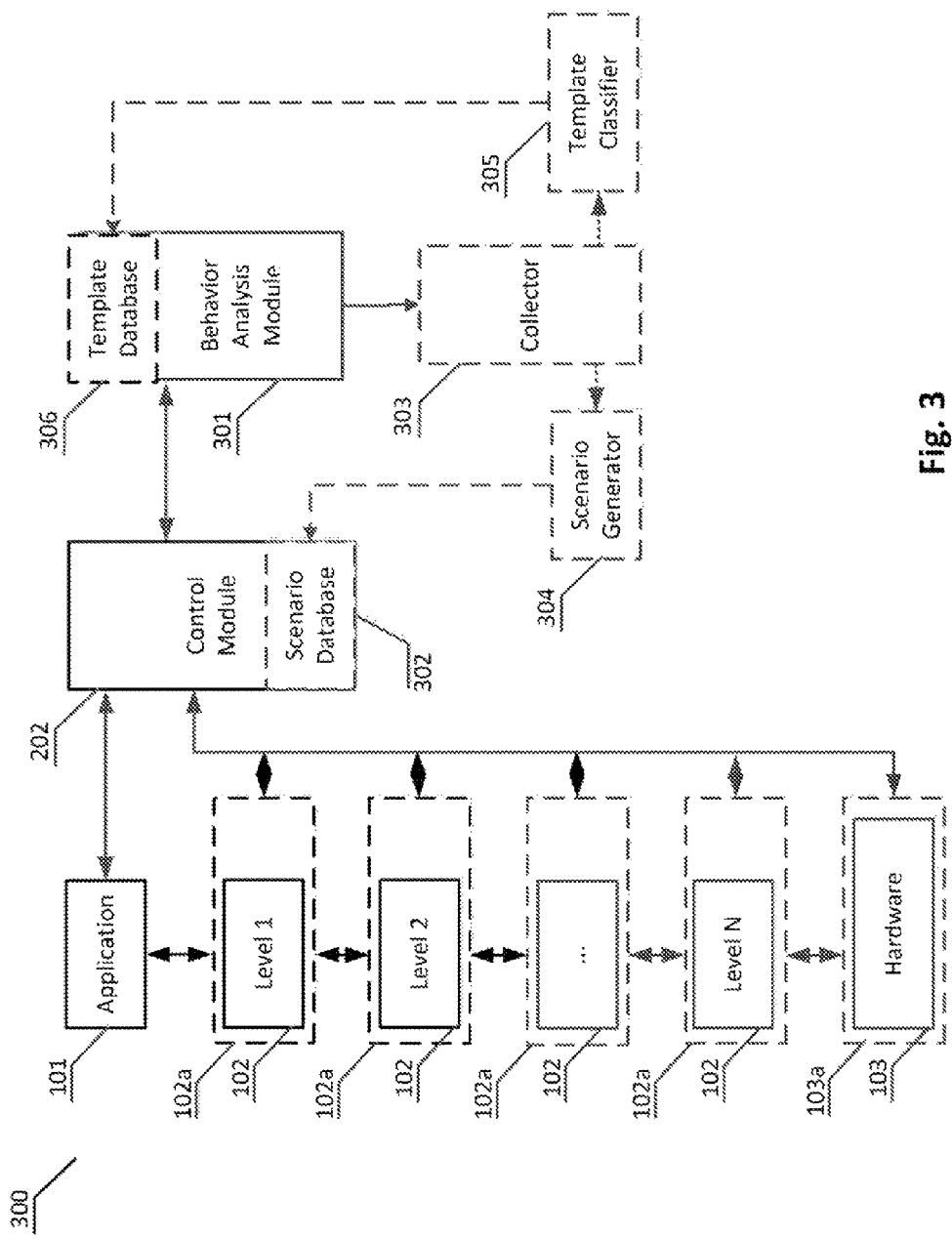
FIG. 3 is a diagram illustrating a system for detection of malicious software using malware trigger scenarios according to aspects of the present invention.

Therefore, to detect a malicious program it may be desirable to not only monitor the software and hardware of the computer device on which this program executes, but also to create certain conditions in the environment of the application while it is being executed. FIG. 3 shows one example implementation of a system for malware detection, which utilizes malware trigger scenarios for detection of malicious software. As used herein, a "scenario" refers to a list of malware trigger events that trigger malicious activity in the tested application. In one example aspect, the scenario may be executed by the control module 202 of system 300.

Particularly, in one aspect, the control module 202 of system 300 may be configured to select a malware trigger scenario from scenario database 302, start application 101 on the system 300, and create malware trigger events described in the selected scenario. The control module 202 may have feedback with the levels 102a and 103a, and the execution of the scenario may involve the creation by the levels 102a and 103a of the malware trigger events under the command of the control module 202. During its execution, the application 101 may cause a series of events on each level 102a and 103a involved in the execution of the application 101. The functions at modified levels 102*a* and 103*a* (or in handlers 201 of FIG. 2A) may record information about events of execution of the application 101 and the control module 202 may accumulate this information. The collected information may be analyzed by the behaviour analysis module 301. If as a result of the analysis, the behaviour of the application is found to be harmful, the control module 202 may take remedial action, such as halting the execution of the application 101 and place it in quarantine. If no harmful activity was detected in the behaviour of the application 101, the control module 202 may select another scenario from database 302 for testing of the application. This cycle may continue until the application 101 produces a harmful activity, or until the control module 202 uses up all available scenarios.

In one example aspect, the scenario database 302 is generated on remote antivirus server and transmitted to the user computer system 300 by means of an update.

In one example aspect, the system 300 may also include a collector 303, which gathers information on which events in the environment 102*a* and 103*a* which trigger malicious activity in the application 101. Based on the data gathered by the collector 303, the scenario generator 304 may create optimized scenarios and transmit them to the scenario database 302. Optimization of scenarios is used to improve the performance of the malware detection system. In one example aspect, optimization of scenarios is performed as follows: On the basis of the information collected by the collector 303, a list of popular malware trigger events is compiled for different malware trigger scenarios. The scenario generator 304 then forms the popular scenarios from the list of popular malware trigger events and transmits them to the scenario database 302. In the scenario database 302, the scenarios are ordered in order of popularity, so that control module 202 selects most popular scenarios first for testing applications 101 for presence of malware followed by less popular scenarios.

In one example aspect, the information gathered by the collector 303 may also be used by a template classifier 305 which classifies malicious behaviour templates used by the behaviour analysis module 301 for purpose of conducting malware analysis of the tested application. The template classifier 305 determines which malware behaviour templates work with which malware trigger events and establishes the popularity of the malicious behaviour templates. In the template database 306, the templates may be placed in order of popularity of use as established by the template classifier 305. For example, there is a malware trigger event of an incoming call, and the most popular programs activating its malicious function in such a scenario (incoming call) are, for example, spyware programs, which track the user's incoming calls and reroute this information to the hacker. The template classifier 305 immediately matches up this malware trigger event (i.e., incoming call) with the behaviour template characteristic of this type of malware. If in the analysis of the programs triggered by the indicated malware trigger scenario no corresponding behaviour template was identified, all remaining templates may be used for the malware analysis. Such a solution makes it possible to increase the operating efficiency of the malware detection system 300.

Figure 4:
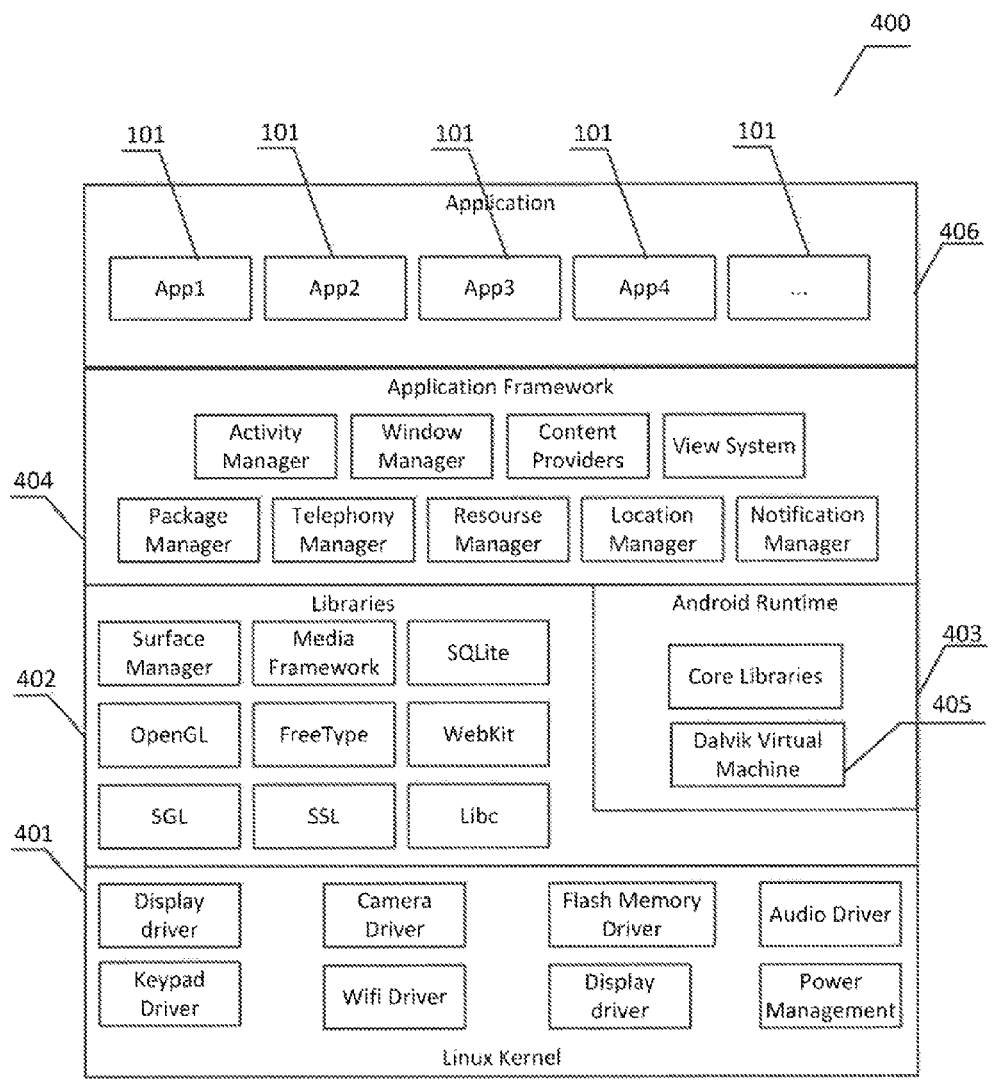
FIG. 4 is a diagram illustrating example architecture of a mobile operating system Android OS which may be utilized to implement aspects of the present invention.

FIG. 4 illustrates an example mobile platform, Android OS, on which the system and methods for detection of computer malware using malware trigger scenarios may be used. The Android architecture is based on a Linux kernel 401. The kernel 401 is responsible for such system services as security management, memory, processes; it includes a network stack and a model of drivers. The next level in the hierarchical structure is libraries 402 written in C/C++ and used by different components of the OS. An important part of the architecture is Android Runtime (i.e., the application execution environment) 403. The execution environment consists of a Java virtual machine Dalvik 405 and a set of basic libraries. Dalvik executes files in a special format, .dex, optimized for devices with a small amount of memory. The basic libraries are written in Java language and include a large set of classes which support a broad range of functional capabilities. The next level is the Application Framework 404. This level is a tool box that is used by all applications. At the top of the hierarchy are the Applications (the application level) 406. The platform has a peculiarity in that applications are executed in a sandbox (a rigorously monitored set of resources for executing a guest program) and do not have the right to modify components situated on the same level or lower levels.

Figure 5:
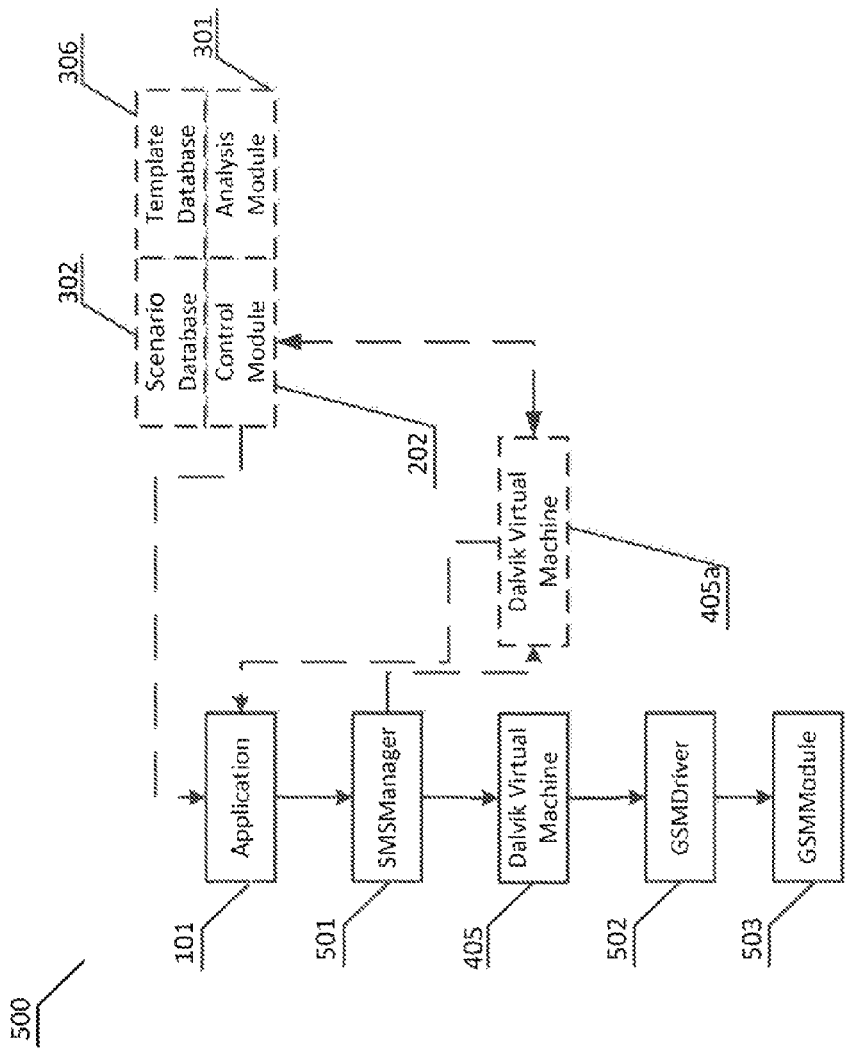
FIG. 5 is a diagram illustrating an example interaction of an application with a mobile platform having a malware detection system according to aspects of the present invention.

FIG. 5 shows a sequence of interaction of the components of the mobile platform 400 of FIG. 4 when sending an SMS message. To send an SMS message, the application 101 uses a corresponding method implemented in the component SMS Manager 501; said function will be executed by the virtual machine Dalvik 405, which will execute a call up of the GSM Driver 502 driver functions to perform the requested action, and this will issue a command to the module GSM Module 503, as a result of which the message will be sent.

In one example aspect, the Android Runtime level, and specifically, its virtual machine Dalvik 405, may be modified according to principles disclosed herein, to generate a virtual machine DAlvik 405*a*, in order to test applications 101 for presence of malware. Various malware trigger events may be created in the environment 405*a* (e.g., simulating the pressing of the buttons of the application interface, arrival of new messages or calls, rebooting of the system, change of network registration, and so on). The application 101 is started by control module 202 in a separate process not having a visible user interface and not having any system authorizations, i.e., the application is not able to cause any harm to the environment. The virtual machine Dalvik 405*a* records information on the events caused by the tested application 101 in response to the various malware trigger events created by the control module 202. The recorded information is analyzed by the analysis module 301. If, on the basis of the analysis by comparing the recorded information on behaviour against malware behaviour templates from the template database 302, the tested application 101 is found to be malicious, the control module 202 may delete this application from system 500, for example.

An example of the operation of the system for detection of malware is to detect on the computer system 500 a spyware program 101, which waits for the arrival of an SMS at the computer system 500 and reroutes it to the remote hacker's device. Having started this application to check its behaviour, no events indicating a malicious function (i.e., sending of incoming messages to the hacker's device) will be detected in the information gathered by the behaviour analyzer, since the malware trigger event of an incoming SMS message is necessary to activate the malicious function. Therefore, the tested application 101 may be started in the modified virtual machine 405*a* of computer system 500, and control module 202 may create in the virtual machine 405*a* event(s) of the receipt of a SMS message, in accordance with one of the selected malware trigger scenarios. The virtual machine 405*a* records information on the events caused by the execution of the tested application 101. Since an event occurred in the environment of the spyware program 101 that activates the malicious function, the analysis module 301 will detect events characteristic of malicious software in the information recorded by the virtual machine 405a, and the spyware application 101 may be halted and deleted.

In one example aspect, the control module 202 may select malware trigger scenarios for testing of applications based on the analysis of the installation package of the application being tested for malware. For example, it is possible to analyze a list of necessary authorizations to access protected parts of the API and interactions with other applications. The authorizations are contained in a manifest file, which encapsulates the entire architecture of the Android application, its functional capabilities and configuration, if the analysis of the authorizations shows that the application does not work with SMS, activation events associated with the sending and receiving of SMS should be eliminated from the list of malware trigger scenarios suitable for testing of this application for presence of malware.

In another example aspect, the control module 202 may select malware trigger scenarios for testing of the application based on a static analysis of the application. For example, control module 202 may analyse APIs used by the application 101 and, on the basis of this analysis, excluding from the malware trigger scenarios those malware trigger events whose activation does not trigger the tested application.

Figure 6:
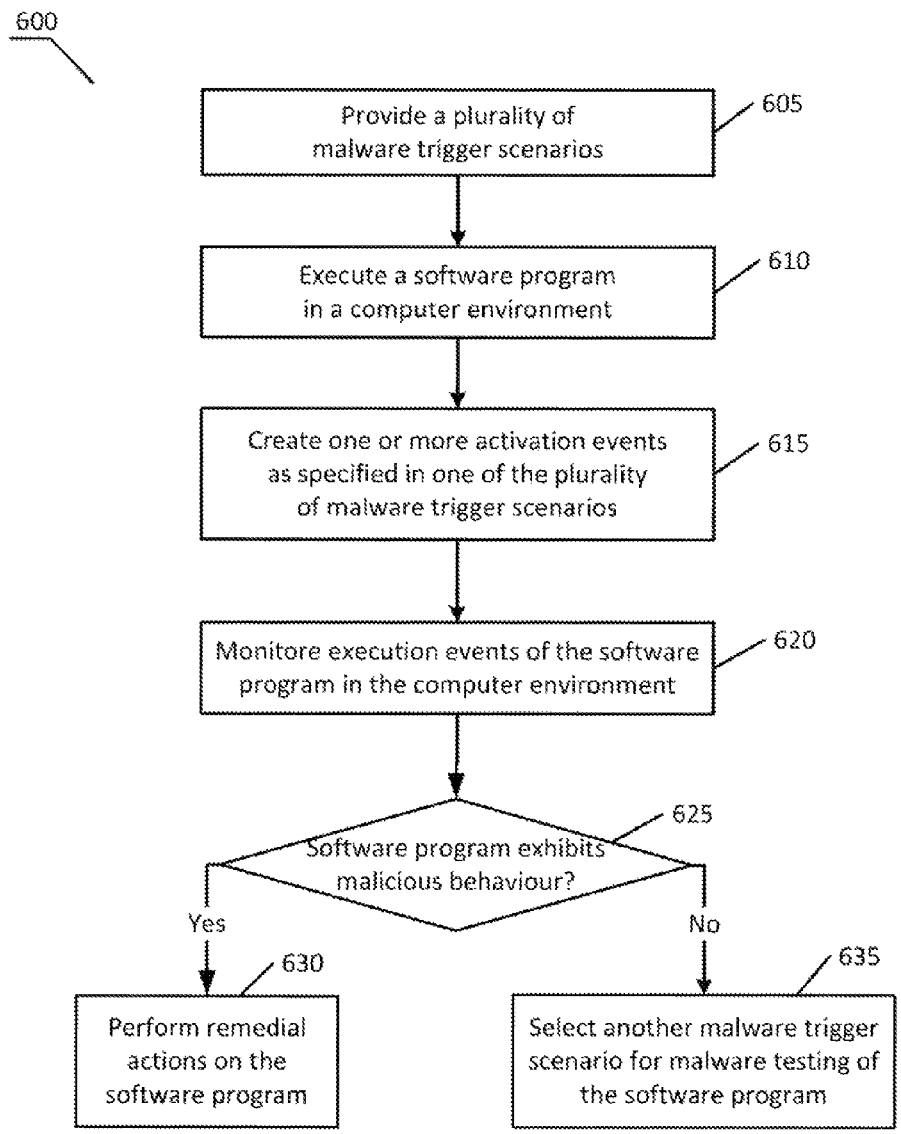
FIG. 6 is a flow diagram illustrating an example method for detecting malware using malware detection system in accordance with aspects of the present invention.

FIG. 6 shows an example method for detecting malware in accordance with aspects of the present invention. At step 605, the method 600 includes providing a plurality of malware trigger scenarios specifying different sets of malware trigger events known to trigger malicious behaviour in malicious software. For example, in one aspect, scenario database 302 (FIG. 3) may provide a plurality of malware trigger scenarios. At step 610, the method 600 includes executing a software program in a computer environment. For example, in one aspect, the computer environment includes a computer system 200B (FIG. 2D). At step 615, the method 600 includes creating in the computer environment one or more malware trigger events specified in a malware trigger scenario for malware testing of the software program. For example, in one aspect, the control module 202 (FIG. 2) may create these malware trigger events. At step 620, the method 600 includes monitoring execution events of the software program in the computer environment. For example, in one aspect, the control module 202 may monitor execution events via handlers 201 (FIG. 2A). At step 625, the method 600 includes determining based on analysis of the monitored execution events whether the software program exhibits malicious behaviour. For example, in one aspect, the analysis module 301 may analyze program execution events. When the software program exhibits malicious behaviour, the method 600 proceeds to step 630 at which remedial actions are performed on the malicious software. For example, in one aspect, the control module 202 may perform remedial actions, e.g., blocking program API function calls and/or quarantining the malicious program. When the software program does not exhibit malicious behaviour, the method 600 proceeds to step 635 at which it selects another malware trigger scenario from the plurality of malware trigger scenarios for malware testing of the software program. For example, in one aspect, the control module 202 may select another malware trigger scenario from the scenario database 302.

Figure 7:
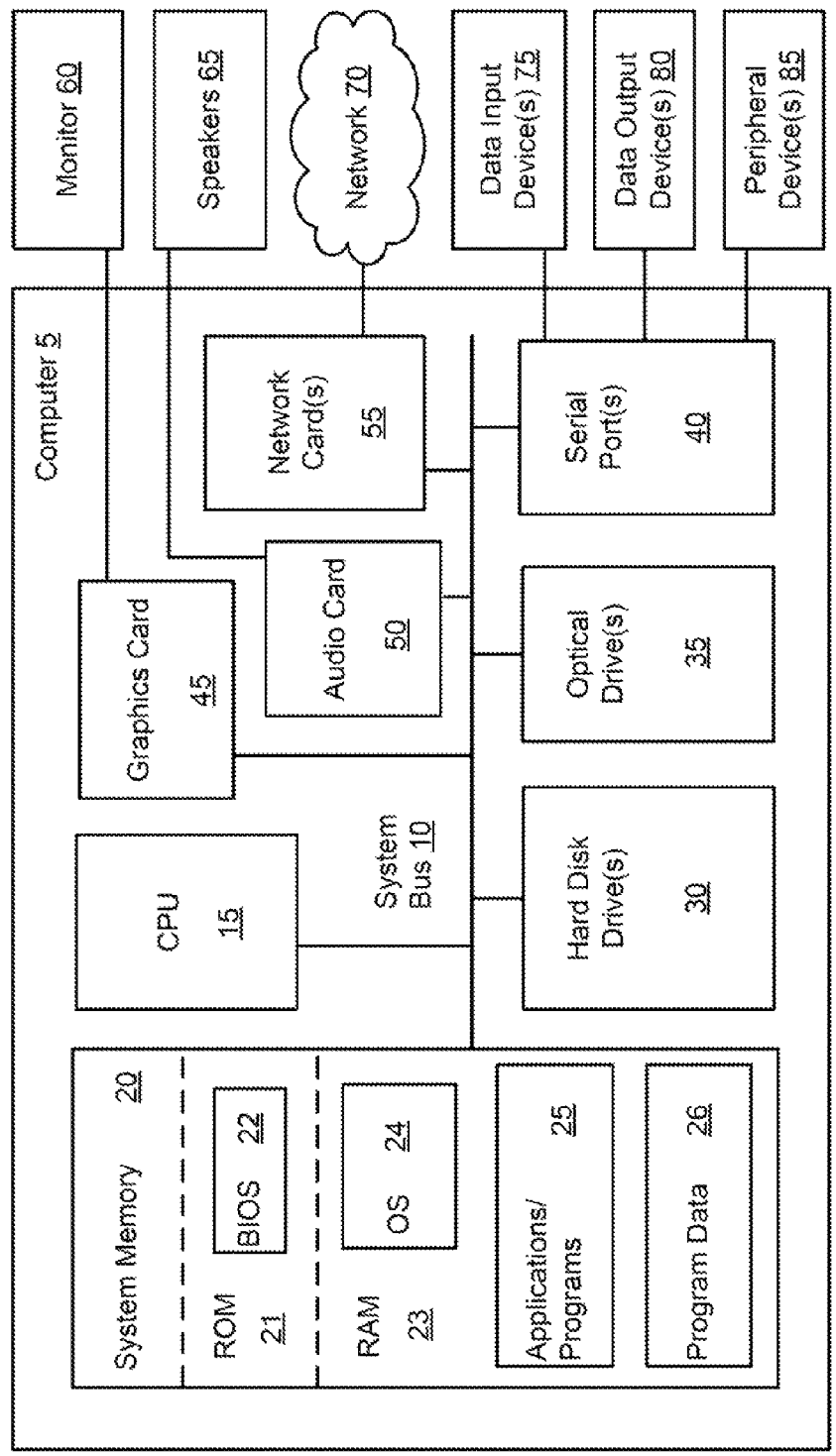
FIG. 7 is a block diagram illustrating an example general-purpose computer system in accordance with aspects of the present invention.

FIG. 7 depicts an example configuration of a general-purpose computer 5 that can be used to implement the disclosed system and methods for protecting computer resources from unauthorized access according to various aspects of the present invention. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for malware testing of software programs, the method comprising:
    providing a plurality of malware trigger scenarios specifying different sets of malware trigger events known to trigger malicious behaviour in a malicious software and modifying a computer environment for control over an execution of a software program;
    executing, by a hardware processor, the software program in a modified computer environment;
    creating, by the hardware processor, in the modified computer environment one or more malware trigger events as specified in one of the plurality of malware trigger scenarios for malware testing of the software program;
    monitoring execution events of the software program in the modified computer environment;
    determining based on an analysis of the monitored execution events whether the software program exhibits malicious behaviour;
    when the software program exhibits malicious behaviour, performing, by the hardware processor, remedial actions on the software program, identifying one or more malware trigger events that triggered the malicious behaviour, and placing the identified malware trigger events in an optimized malware trigger scenario of popular events; and
    when the software program does not exhibit malicious behaviour, selecting another malware trigger scenario from the plurality of malware trigger scenarios for malware testing of the software program.

2. The method of claim 1, wherein the one or more malware trigger events include one or more of application events, operating system (OS) events and hardware events of the computer environment.

3. The method of claim 2, wherein executing the software program in the modified computer environment includes providing a plurality of interrupt handlers operable to monitor application events, OS events and hardware events of the computer environment.

4. The method of claim 1, wherein determining based on the analysis of the monitored execution events whether the software program exhibits malicious behaviour further includes:
    associating one or more malware trigger events known to trigger malicious behaviour in the malicious software with one or more templates of malicious behaviour; and
    analyzing whether the monitored execution events match any of the templates of malicious behaviour to determine whether the software program exhibits malicious behaviour.

5. A method for malware testing of software programs, the method comprising:
    providing a plurality of malware trigger scenarios specifying different sets of malware trigger events known to trigger malicious behaviour in a malicious software and modifying a computer environment for control over an execution of the software program;
    executing, by a hardware processor, a software program in a modified computer environment by analyzing application program interface (API) functions of the software program and selecting from a plurality of malware trigger scenarios a malware trigger scenario having similar API calls;
    creating, by the hardware processor, in the modified computer environment one or more malware trigger events as specified in one of the plurality of malware trigger scenarios for malware testing of the software program;
    monitoring execution events of the software program in the modified computer environment;
    determining based on an analysis of the monitored execution events whether the software program exhibits malicious behaviour;
    when the software program exhibits malicious behaviour, performing, by the hardware processor, remedial actions on the software program; and
    when the software program does not exhibit malicious behaviour, selecting another malware trigger scenario from the plurality of malware trigger scenarios for malware testing of the software program.

6. A system for malware testing of software programs, the system comprising:
    a data store containing a plurality of malware trigger scenarios specifying different sets of malware trigger events known to trigger malicious behaviour in a malicious software;

a processor coupled to the data store and configured to:
    modify a computer environment for control over an execution of a software program based on a malware trigger scenario;
    execute the software program in a modified computer environment;
    create in the modified computer environment one or more malware trigger events as specified in one of the plurality of malware trigger scenarios for malware testing of the software program;
    monitor execution events of the software program in the modified computer environment;
    determine based on an analysis of the monitored execution events whether the software program exhibits malicious behaviour;
    when the software program exhibits malicious behaviour, perform remedial actions on the software program, identifying one or more malware trigger events that triggered the malicious behaviour, and placing the identified malware trigger events in an optimized malware trigger scenario of popular events; and
    when the software program does not exhibit malicious behaviour, select another malware trigger scenario from the plurality of malware trigger scenarios for malware testing of the software program.

7. The system of claim 6, wherein the one or more malware trigger events include one or more of application events, operating system (OS) events and hardware events of the computer environment.

8. The system of claim 7, wherein to execute the software program in the modified computer environment, the processor is further configured to provide a plurality of interrupt handlers operable to monitor application events, OS events and hardware events of the computer environment.

9. The system of claim 6, wherein to determine based on the analysis of the monitored execution events whether the software program exhibits malicious behaviour, the processor is further configured to:
    associate one or more malware trigger events known to trigger malicious behaviour in the malicious software with one or more templates of malicious behaviour; and
    analyze whether the monitored execution events match any of the templates of malicious behaviour to determine whether the software program exhibits malicious behaviour.

10. A system for malware testing of software programs, the system comprising:
    a data store containing a plurality of malware trigger scenarios specifying different sets of malware trigger events known to trigger malicious behaviour in a malicious software;
    a processor coupled to the data store and configured to:
        modify a computer environment for control over an execution of a software program;
        execute a software program in a modified computer environment by analyzing application program interface (API) functions of the software program and selecting from a plurality of malware trigger scenarios a malware trigger scenario having similar API calls;
        create in the modified computer environment one or more malware trigger events as specified in one of the plurality of malware trigger scenarios for malware testing of the software program;
        monitor execution events of the software program in the modified computer environment;
        determine based on an analysis of the monitored execution events whether the software program exhibits malicious behaviour;
        when the software program exhibits malicious behaviour, perform remedial actions on the software program; and
        when the software program does not exhibit malicious behaviour, select another malware trigger scenario from the plurality of malware trigger scenarios for malware testing of the software program.

11. A computer program product stored on a non-transitory computer-readable storage medium, the computer program product comprising computer-executable instructions for malware testing of software programs, including instructions for:
    providing a plurality of malware trigger scenarios specifying different sets of malware trigger events known to trigger malicious behaviour in a malicious software and modifying a computer environment for control over an execution of the software program;
    executing a software program in a modified computer environment;
    creating in the computer environment one or more malware trigger events as specified in one of the plurality of malware trigger scenarios for malware testing of the software program;
    monitoring execution events of the software program in the modified computer environment;
    determining based on an analysis of the monitored execution events whether the software program exhibits malicious behaviour;
    when the software program exhibits malicious behaviour, performing remedial actions on the software program, identifying one or more malware trigger events that triggered the malicious behaviour, and placing the identified malware trigger events in an optimized malware trigger scenario of popular events; and
    when the software program does not exhibit malicious behaviour, selecting another malware trigger scenario from the plurality of malware trigger scenarios for malware testing of the software program.

12. The product of claim 11, wherein the one or more malware trigger events include one or more of application events, operating system (OS) events and hardware events of the computer environment.

13. The product of claim 12, wherein the instructions for executing the software program in the modified computer environment further include instructions for providing a plurality of interrupt handlers operable to monitor application events, OS events and hardware events of the computer environment.

14. The product of claim 11, wherein the instructions for determining based on the analysis of the monitored execution events whether the software program exhibits malicious behaviour further include instructions for:
    associating one or more malware trigger events known to trigger malicious behaviour in the malicious software with one or more templates of malicious behaviour; and
    analyzing whether the monitored execution events match any of the templates of malicious behaviour to determine whether the software program exhibits malicious behaviour.

15. A computer program product stored on a non-transitory computer-readable storage medium, the computer program product comprising computer-executable instructions for malware testing of software programs, including instructions for:

providing a plurality of malware trigger scenarios specifying different sets of malware trigger events known to trigger malicious behaviour in a malicious software and modifying a computer environment for control over an execution of the software program;

executing a software program in a modified computer environment by analyzing application program interface (API) functions of the software program and selecting from a plurality of malware trigger scenarios a malware trigger scenario having similar API calls;

creating in the computer environment one or more malware trigger events as specified in one of the plurality of malware trigger scenarios for malware testing of the software program;

monitoring execution events of the software program in the modified computer environment;

determining based on an analysis of the monitored execution events whether the software program exhibits malicious behaviour;

when the software program exhibits malicious behaviour, performing remedial actions on the software program; and when the software program does not exhibit malicious behaviour, selecting another malware trigger scenario from the plurality of malware trigger scenarios for malware testing of the software program.

16. The method of claim 1, wherein creating in the modified computer environment, one or more malware trigger events includes: creating one or more popular malware trigger events are specified in an optimized malware trigger scenario that includes popular events based on software program and modified computer environment.

17. The system of claim 6, wherein to create in the modified computer environment, one or more malware trigger events the processor further configured to create one or more popular malware trigger events are specified in an optimized malware trigger scenario that includes popular events based on software program and modified computer environment.

18. The product of claim 11, wherein creating in the modified computer environment, one or more malware trigger events includes: creating one or more popular malware trigger events are specified in an optimized malware trigger scenario that includes popular events based on software program and modified computer environment.

* * * * *